United States Patent [19]

Gentry et al.

[11] Patent Number: 5,330,226
[45] Date of Patent: Jul. 19, 1994

[54] METHOD AND APPARATUS FOR DETECTING AN OUT OF POSITION OCCUPANT

[75] Inventors: Scott B. Gentry, Romeo; Joseph F. Mazur, Washington; Brian K. Blackburn, Rochester, all of Mich.

[73] Assignee: TRW Vehicle Safety Systems Inc., Lyndhurst, Ohio

[21] Appl. No.: 986,041

[22] Filed: Dec. 4, 1992

[51] Int. Cl.⁵ .................. B60R 21/22; B60R 21/26; B60R 21/28
[52] U.S. Cl. .................... 280/735; 340/540; 280/736; 280/739
[58] Field of Search ............ 280/728 R, 730 R, 735; 340/436, 438, 540, 567; 180/272

[56] References Cited

U.S. PATENT DOCUMENTS

| | | |
|---|---|---|
| 2,166,580 | 7/1939 | Caldwell .................... 180/272 |
| 3,512,155 | 5/1970 | Bloice . |
| 3,672,699 | 6/1972 | De Windt . |
| 3,748,639 | 7/1973 | Dobedoe et al. . |
| 3,767,002 | 10/1973 | Gillund . |
| 3,774,151 | 11/1973 | Lewis et al. . |
| 3,860,904 | 1/1975 | Andersen . |
| 3,898,472 | 1/1975 | Long . |
| 3,935,470 | 1/1976 | Cake . |
| 3,981,518 | 9/1976 | Pulling . |
| 4,418,335 | 11/1983 | Genahr . |
| 4,476,461 | 10/1984 | Carubia . |
| 4,625,329 | 11/1986 | Ishikawa et al. . |
| 4,740,701 | 4/1988 | Wuthrich et al. . |
| 4,795,905 | 1/1989 | Zierhut . |
| 4,796,013 | 1/1989 | Yasuda et al. . |
| 4,804,859 | 2/1989 | Swart . |
| 4,845,377 | 7/1989 | Swart . |
| 4,849,635 | 7/1989 | Sugimoto .................... 340/567 |
| 4,886,295 | 12/1989 | Browne .................... 280/777 |
| 4,951,963 | 8/1990 | Behr et al. . |
| 4,973,843 | 11/1990 | Murata et al. . |
| 4,985,835 | 1/1991 | Sterler et al. . |
| 5,071,160 | 12/1991 | White et al. .................... 280/735 |
| 5,074,583 | 12/1991 | Fujita et al. .................... 280/735 |
| 5,118,134 | 6/1992 | Mattes et al. .................... 280/735 |

FOREIGN PATENT DOCUMENTS

| | | |
|---|---|---|
| 2516185 | 10/1975 | Fed. Rep. of Germany ... 280/730 R |
| 3802159 | 8/1989 | Fed. Rep. of Germany ... 280/728 R |
| 4137719 | 9/1992 | Fed. Rep. of Germany ... 280/730 R |
| 2243533 | 11/1991 | United Kingdom . |

OTHER PUBLICATIONS

"16-Step Range-Finder IC" by Hamamatsu Technical Data.
"Kynar Piezo Film Sensor" by Pennwalt.

Primary Examiner—Karin L. Tyson
Attorney, Agent, or Firm—Tarolli, Sundheim & Covell

[57] ABSTRACT

An apparatus for controlling actuation of a vehicle occupant restraint system includes a displacement sensor mounted to the vehicle dashboard for sensing the distance between the air bag storage location and the occupant in a seat. An infrared sensor is mounted in the headliner above the occupant. The infrared sensor has a plurality of viewing fields for sensing the location of the occupant relative to the air bag storage location and provides an output indicative of the occupant's location relative to the air bag storage location. A controller determines the distance between the occupant and the air bag storage location from the output of the infrared sensor. The controller is also connected to the displacement sensor. The controller provides an electric enable signal when at least one of the sensors indicates that the occupant is at least a predetermined distance from the air bag storage location.

40 Claims, 7 Drawing Sheets

METHOD AND APPARATUS FOR DETECTING AN OUT OF POSITION OCCUPANT

TECHNICAL FIELD

The present invention is directed to a vehicle occupant restraint system and is particularly directed to a method and apparatus for sensing an occupant out of position condition in an air bag restraint system.

BACKGROUND OF THE INVENTION

Vehicle occupant restraint systems having an actuatable restraining device are well known in the art. One particular type of actuatable restraining device includes an inflatable air bag mounted to inflate within the occupant compartment of the vehicle. The air bag has an associated, electrically actuatable igniter, referred to as a squib.

Such occupant restraint systems further include a crash sensor for sensing the occurrence of a vehicle crash condition and for providing an electrical signal indicative of the crash condition. When the crash sensor indicates that the vehicle is in a crash condition, an electric current of sufficient magnitude and duration is passed through the squib for the purpose of igniting the squib. The squib, when ignited, ignites a combustible gas generating composition and/or pierces a container of pressurized gas operatively coupled to the air bag, which results in inflation of the air bag.

Even if a vehicle is equipped with an air bag restraint system, it is not always desirable to inflate the air bag every time a crash condition occurs. Crash conditions are classified as either non-deployment crash conditions or deployment crash conditions. Non-deployment crash conditions are those for which the occupant seat belt alone provide adequate protection of the occupant. Deployment crash conditions are those for which deployment of the air bag is required to protect the occupant adequately. U.S. Pat. No. 5,073,860 provides an air bag restraint system including a crash detection arrangement that distinguishes between deployment and non-deployment crash conditions and controls deployment of the air bag in response to the determined type of vehicle crash condition.

Even if a vehicle is equipped with an air bag restraint system and a deployment crash condition occurs, it is still not desirable to deploy the air bag if certain occupant related conditions exist. Specifically, it is not desirable to deploy the air bag if an occupant is absent from a seat location associated with that air bag. Also, if an inanimate object is on the seat, it is not desirable to deploy the air bag during a vehicle deployment crash condition.

Moreover, it is desirable to control deployment of the air bag upon the occurrence of a deployment crash condition as a function of the occupant's position on the vehicle seat. It is desirable to control the inflation profile of the air bag and the timing of deployment dependent upon the occupant's position so as to maximize protection afforded by the air bag. If the air bag is capable of being aimed, it is desirable that the direction of deployment be controlled in response to the occupant's position. If the vehicle is equipped with a plurality of separately deployable air bags for each occupant, it is desirable that the control of the air bag deployments, e.g., which air bags are deployed and the timing of their deployment, be controlled in response to the sensed position of the occupant. If an occupant is completely out of position, it may be desirable that the air bag not be deployed at all. An occupant being out of position means that the occupant is not seated "properly" so that deployment of the air bag would enhance protection of the occupant during a deployment crash condition.

U.S. patent application Ser. No. 682,908, filed Apr. 9, 1991, now U.S. Pat. No. 5,232,243, discloses an air bag restraint system having sensors located in an occupant seat of the vehicle. These sensors detect whether an object in the seat is an inanimate or animate object. The system further determines whether an occupant is properly positioned in the seat. The air bag is deployed upon the occurrence of a vehicle deployment crash condition only if an animate occupant is determined to be present in the seat and if the occupant is properly positioned so that deployment of the air bag would enhance protection of the occupant.

SUMMARY OF THE INVENTION

The present invention provides a method and apparatus for sensing if an occupant is present at a vehicle seat location and the position of the occupant. An enable signal is provided if the occupant is sensed to be present and at a predetermined position in the occupant compartment. In an air bag restraint system, the present invention prevents deployment of the air bag if the vehicle occupant is sensed as being too close to the air bag storage location. To ensure a fail-safe system, two separate occupant position sensing devices are mounted at different locations within the occupant compartment, each having an associated field of view. The air bag restraint system is enabled to permit air bag deployment upon the occurrence of a crash condition if (i) the object on the vehicle seat is determined to be animate and (ii) at least one of the occupant position sensors indicates the occupant is "properly" positioned relative to the air bag storage location. Also, when enabled, the inflation profile of the air bag is controlled as a function of the occupant's sensed position. Control of the air bag profile includes control of the timing when deployment begins and control of the amount of gas used to inflate the air bag.

In accordance with one aspect of the present invention, an apparatus is provided for detecting position of an occupant in the occupant compartment of a vehicle. The apparatus comprises first sensing means mounted at a known location near the front of the occupant compartment for sensing the position of the occupant relative to a predetermined reference location in the occupant compartment and for generating a first electric signal indicative of the sensed position of the occupant relative to the predetermined reference location. The apparatus further includes second sensing means mounted at a location rearward of the first sensing means and adjacent the occupant for (i) sensing the presence of an occupant, (ii) sensing the position of the occupant relative to the predetermined reference location in the occupant compartment, and (iii) providing a second electric signal indicative of the sensed position of the occupant relative to the predetermined reference location as sensed by the second sensing means. Control means is connected to the first sensing means and to the second sensing means for providing an electric enable signal when the second sensing means indicates an occupant is present and when at least one of the first electric signal from the first sensing means and the second electric signal from the second sensing means indicates the occupant is at a predetermined position relative to the predetermined reference location in the occupant compartment.

In accordance with another aspect of the present invention, a method is provided for detecting position of an occupant in an occupant compartment of a vehicle. The method comprises the steps of mounting a first sensor to a known location near the front of the occupant compartment for sensing the position of the occupant relative to a predetermined reference location in the occupant compartment and generating a first electric signal indicative of the sensed position of the occupant relative to the predetermined reference location in the occupant compartment. The method further comprises the steps of mounting a second sensor at a location rearward of the first sensor and adjacent the occupant for sensing (i) the presence of an occupant, (ii) the position of the occupant relative to the predetermined reference location, and (iii) generating a second electric signal indicative of the sensed position of the occupant relative to the predetermined reference location as sensed by the second sensor. An electric enable signal is generated when (i) an occupant is sensed as being present and (ii) at least one of the first electric signal from the first sensor and the second electric signal from the second sensor indicates the occupant is at a predetermined position relative to the predetermined reference location in the occupant compartment.

In accordance with another aspect of the present invention, a passenger restraint system for a vehicle is provided comprising a stored air bag and means for providing gas to inflate the air-bag in response to a trigger signal. Means are provided for monitoring for the occurrence of a vehicle crash event. First sensing means is mounted to a dashboard of the vehicle for sensing distance between the stored air bag and an occupant and for generating a first electric signal indicative of the sensed distance between the stored air bag and the occupant by the first sensing means. Second sensing means is mounted at a location rearward of the first sensing means relative to the vehicle and adjacent the occupant for sensing the presence of an occupant, sensing the distance between the stored air bag and the occupant, and for providing a second electric signal indicative of the sensed distance between the stored air bag and the occupant by the second sensing means. Control means is connected to the first sensing means and to the second sensing means for providing the trigger signal to the means for providing gas to the air bag when (i) an occupant is sensed as being present by the second sensing means, (ii) a vehicle crash event occurs, and (iii) at least one of the first electric signal from the first sensing means and the second electric signal from the second sensing means indicates the occupant is at least a predetermined distance from the stored air bag. The means for providing gas to inflate said air bag preferably includes means to provide a selectable amount of gas to the air bag. The control means preferably includes means for controlling the means to provide a selectable amount of gas to the air bag in response to the sensed distance between the stored air bag and the occupant as determined by both the first sensing means and the second sensing means. The means to provide a selectable amount of gas to the air bag preferably includes a plurality of gas generating sources separately controllable by the control means. The control means actuates a number of the gas generating sources as a function of the sensed distance between the stored air bag and the occupant as sensed by both the first and second sensing means so that the closer the occupant is to the stored air bag, the fewer gas generated sources are actuated upon the occurrence of a crash event. The means to provide a selectable amount of gas to the air bag alternatively includes an electrically controlled vent operatively coupled between a gas generating source and atmosphere and controllably connected to the control means. The control means actuates the electrically controlled vent in response to the sensed distance between the occupant and the stored air bag as sensed by both of the first sensing means and the second sensing means. The control means vents gas produced by the gas generating sources as a function of the sensed distance between the stored air bag and the occupant so that the closer the occupant is to the stored air bag location, the more gas is vented to atmosphere during deployment.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENTS

Figure 1:
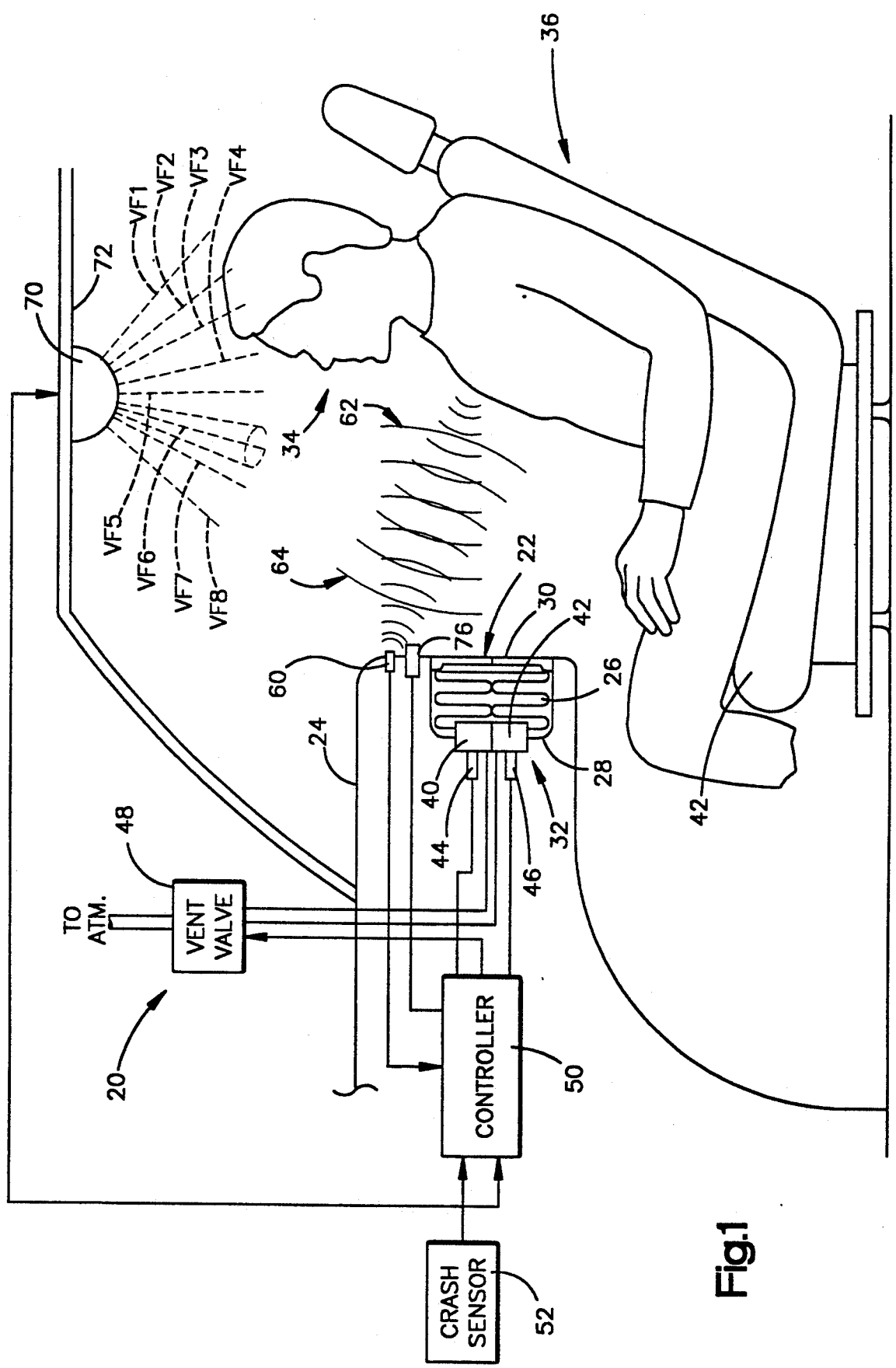
FIG. 1 is a schematic diagram of a vehicle restraint system including an occupant position sensing apparatus made in accordance with the present invention.
Figure 2:
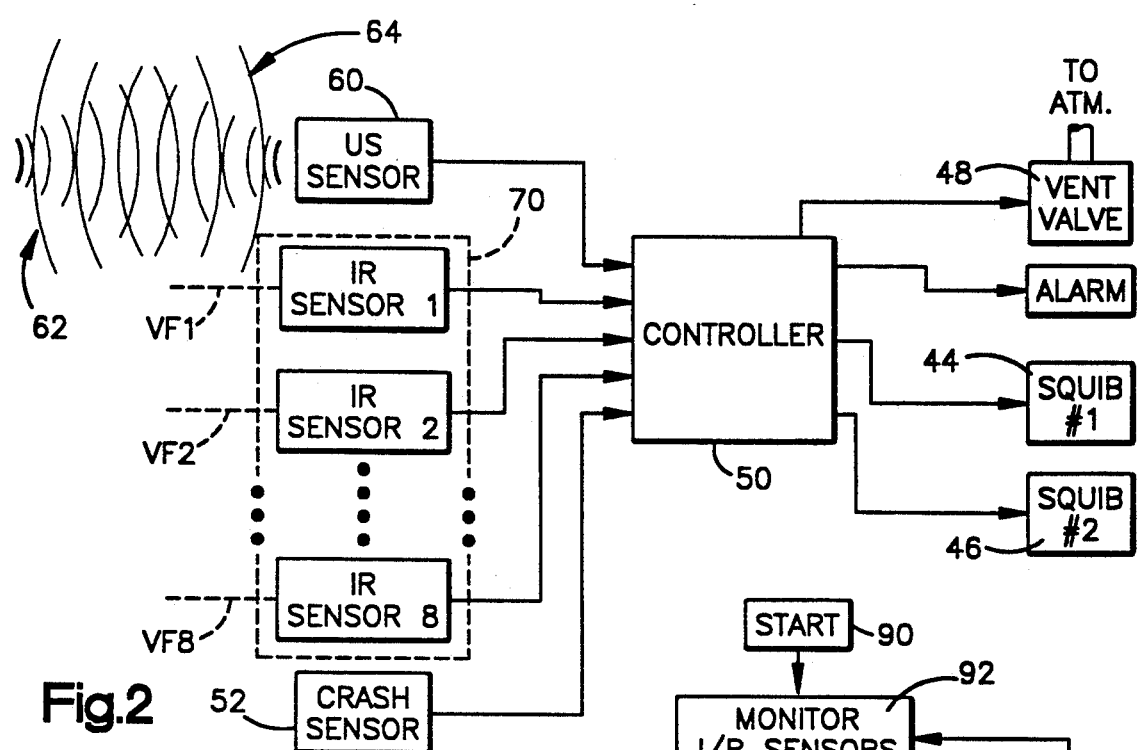
FIG. 2 is a schematic block diagram of a portion of the system of FIG. 1.

Referring to FIGS. 1 and 2, an occupant restraint system 20 includes an air bag assembly 22 mounted in an opening of a dashboard or instrument panel 24 of a vehicle. The air bag assembly 22 includes an air bag 26 folded and stored within the interior of an air bag housing 28. A cover 30 covers the stored air bag and is adapted to open easily upon inflation of the air bag 26.

A source 32 of gas is mounted at the back of the housing 28 and is operatively connected to the air bag 26. Gas from the source 32, which may be generated by combustion of pyrotechnic material and/or released from a pressurized container, fills the air bag 26 to its inflated condition. Once inflated, as occurs during a vehicle crash, the air bag 26 cushions an occupant 34 sitting on a vehicle seat 36.

The source 32 of gas preferably includes two separate sources, such as pyrotechnic charges 40, 42 operatively connected to the air bag 26. Each o f the charges 40, 42 has an associated igniter 44, 46, respectively. An electrically controlled vent valve 48 is operatively connected to both of the charges 40, 42. When the vent valve 48 is opened electrically, a certain amount of the gases from the charges 40, 42 is vented to atmosphere, thereby decreasing the amount of gas entering the air bag 26.

An electronic controller 50, such as a microcomputer, is operatively connected to the two igniters 44, 46 and to the electrically controlled vent valve 48. The controller 50 controls inflation of the air bag 26 to one of several discrete levels through control of the igniters 44, 46 and the electrically controlled vent valve 48. Specifically, if the controller 50 maintains the vent valve 48 closed and fires both igniters 44, 46, the air bag 26 inflates with 100% of the gas provided by the charges 40, 42. If the vent valve 48 is controlled to an open condition and both igniters 44, 46 are fired, the air bag 26 is inflated with 75% of the gas provided by the charges 40, 42. If the vent valve 48 is controlled to a closed condition and only one of the igniters 44, 46 is fired, the air bag is inflated with 50% of the maximum possible gas that could be provided by both the charges 40, 42. If the vent valve 48 is controlled open and only one of the igniters 44, 46 is fired, the air bag is inflated with 37½% of the maximum possible gas that could be provided by both the charges 40, 42. This arrangement, therefore, provides four discrete inflation levels for the air bag 26. Each of the different inflation levels provides an associated dynamic inflation profile during deployment of the air bag 26.

The controller 50 is further connected to a vehicle crash sensor 52. The crash sensor 52 can be any of several known types. For example, the crash sensor 52 may be a mechanical inertia switch, such as a rolamite sensor, or an electrical accelerometer. If a normally open mechanical inertia switch is used, the electrical contacts are normally open during a non-crash condition. If a crash condition occurs, the normally open contacts close. Therefore, closure of the switch contacts is indicative of the occurrence of a vehicle crash condition.

If an electrical accelerometer is used as the crash sensor 52, there are several known ways of determining if a crash condition is occurring from the accelerometer output signal. One method is to compare the integrated amplitude of the accelerometer signal against a predetermined level. If the value of the integrated accelerometer signal reaches a predetermined level or maintains a predetermined level for a predetermined time, this is an indication that a crash condition is occurring. Once the controller 50 determines that a vehicle crash is occurring for which deployment of the air bag is necessary to protect the vehicle occupants, and if certain occupant conditions are appropriate, the controller 50 ignites one or both of the squibs 44, 46 and appropriately controls the electrically controlled vent valve 48 so as to inflate the air bag with a desired amount of gas. Whether or not the air bag is to be inflated upon the occurrence of a vehicle crash condition and the amount or degree of inflation, i.e., the amount of gas directed to the air bag, is determined by the presence and position of an occupant 34 in the seat 36 associated with that air bag.

To sense the position of the occupant 34, an ultrasonic sensor 60 is mounted in the dashboard 24 and is electrically connected to the controller 50. The controller 50 triggers the ultrasonic sensor 60 to produce an ultrasonic pulse 62. When the ultrasonic pulse 62 strikes the occupant 34, a reflected pulse 64 is returned to the ultrasonic sensor 60. The ultrasonic sensor 60 provides an electric signal indicative of the receipt of a returned signal or echo pulse 64 to the controller 50. The controller 50 determines the time between transmission of the pulse 62 and receipt of the echo pulse 64 and from this time differential, calculates the distance between (a) the sensor 60 and stored air bag 26 and (b) the occupant.

The front cover 30 of the air bag is used as a reference location within the occupant compartment. The distance determined by the controller is the distance from the air bag cover to the position or location of the occupant. Throughout this application, the air bag cover 30 is used as the point of reference. This point of reference is also referred to as the air bag storage location.

As an alternative to the use of an ultrasonic sensor, an active infrared sensor may be used. In an active infrared sensor, a pulsed infrared ray from an LED (light emitting diode) is produced. An infrared receiver or monitoring lens monitors for a reflection of the transmitted infrared pulsed ray. Such an active infrared sensor is manufactured by Hamamatsu Photonics K.K., Solid State Division, of Hamamatsu City, Japan, under part No. H2476-01.

To provide a second means for sensing the position of the occupant 34 and further to sense for the presence of an animate object on the vehicle seat 36, an infrared sensor 70 is mounted in the headliner 72 at a location rearward of the sensor 60 and stored air bag 26 and forward of the back of the seat 36. Preferably, the sensor 70 is located half way between the back of the seat 36 and the cover 30 of the stored air bag. The infrared sensor 70 may be either a passive or active sensor but is preferably a pyroelectric passive infrared detector of the type manufactured by Pennwalt, Kynar Piezo Film Sensor Division, of Valley Forge, Pa., under part No. PIR 180-100.

A passive infrared sensor, such as the PIR 180-100, can be modified so as to divide a wide angle field of view into a plurality of separate viewing fields ("VF"). This is accomplished by discretely partitioning a Fresnel lens that forms the outside portion of the sensor 70 into a desired viewing field pattern and dividing the infrared sensing element into a plurality separately monitorable sensors. As an alternative, a plurality of separate infrared sensors can be used with each being aimed so as to provide the separate viewing fields. In accordance with one embodiment of the present invention, the sensor 70 has eight separate viewing fields designated VF1, VF2, VF3, VF4, VF5, VF6, VF7, and VF8. The different viewing fields is accomplished using the separate IR sensors, each with its own associated field of view.

In accordance with one embodiment of the present invention, some of the viewing fields of the sensor 70 are angled toward the front of the vehicle, i.e., toward the air bag cover 30. Other of the viewing fields of the sensor 70 are angled toward the rear of the vehicle, i.e., toward the seat 36. The viewing fields VF1-VF8 preferably have equal angles between adjacent viewing fields. Those skilled in the art will appreciate that any number of viewing fields could be used. The number of viewing fields preferably is sufficient to cover the area between the back of the seat 36 and the dashboard 24 and provide a desired system resolution. The greater the number of separate viewing fields, the greater the system resolution. To provide a reasonable degree of resolution, it is contemplated that the minimum number of viewing fields is four.

The infrared sensor 70 is electrically connected to the controller 50. Each of the viewing fields VF1-VF8 (also referred to herein as separate infrared sensors) has an associated output providing an electrical signal indicative of whether or not an animate object, i.e., an occupant, has (i) entered its viewing field, or (ii) left its viewing field.

The sensors 60 and 70 are not actuated until the vehicle engine is started. After an occupant 34 enters the vehicle, sits on the seat 36, and the vehicle engine is started, any subsequent movement by the occupant will be detected by the sensor 70. The detection of infrared energy from the object on the vehicle seat by the infrared sensor is indicative that the object on the seat is an animate object. If infrared energy is detected by any of the sensors VF1-VF8, the sensors that detected the infrared energy switch to an ON condition. When at least one of the infrared sensors detects infrared energy, i.e., at least one sensor has switched ON, such a detection indicates that the object on the seat is animate. It is assumed that after the vehicle is started, some occupant motion would occur that would be detected by the sensor 70. Once an occupant is detected as being present after the vehicle is started, it is assumed, in accordance with one preferred embodiment of the present invention, that the occupant is continuously present until the vehicle is turned OFF. If no infrared energy is detected after the vehicle is started, such is an indication that the object on the seat is inanimate. If the object on the seat is inanimate or no object is present at all, it is desirable to disable the air bag, thereby preventing its deployment during a vehicle crash event.

If, after an occupant has been initially detected, the occupant 34 remains sitting perfectly motionless on the seat 36 for a predetermined amount of time, his continued presence becomes part of a steady state ambient condition "seen" by the sensor 70. After a predetermined time period of continuous occupant presence with no motion, the outputs of the sensors VF1-VF8 change to indicate no change in the then present ambient condition is occurring. After such a predetermined time period of sitting motionless, the sensors VF1-VF8 all turn OFF.

If the occupant begins to move forward after a motionless period, as happens during a vehicle crash condition or a sudden deceleration of the vehicle, his head moves from the viewing field of a low number sensor, e.g., VF3, into the viewing field of a higher designated sensor, e.g., VF6 or higher. Whether or not an occupant is "seen" as moving within the sensor's viewing fields after the occupant has been seated in the field for a time period is functionally related to the distance between the sensor 70 and the occupant. When the occupant 34 is sitting on the seat 36, his legs are already in the viewing field VF6. The distance between the sensor VF6 and the occupant's legs is greater than the distance between the sensor VF6 and the occupant's head when his head enters the viewing field VF6. The amount or degree of infrared radiation detected by the sensors VF1-VF8 is a function of the distance between the object and the sensor. When the occupant's head enters the viewing field VF6, the sensor's output indicates occupant movement is occurring, i.e., the occupant has "entered" the viewing field VF6. This output is produced because the occupant's head is at a closer distance to the sensor 70 than the occupant's legs and the amount of infrared radiation detected correspondingly increases.

The controller 50 separately monitors each of the viewing fields VF1-VF8 of the sensor 70. Based on the signals from the sensor 70, the presence and position of the occupant is determined by the controller 50 relative to the air bag cover 30. The use of two separate and independent occupant position sensors 60 and 70 prevents a false indication of occupant's position on the vehicle seat. Knowing the occupant's position on the seat 36 permits control of whether or not the air bag is deployed during a vehicle crash condition and controls the degree of air bag inflation and dynamic air bag profile during deployment. The dynamic air bag profile includes (a) the timing of when deployment begins and (b) the rate at which the air bag is inflated. Also, the occupant's movement forward is useful in determining whether or not a vehicle crash condition is occurring.

An indicator 76 is mounted in the dashboard 24 and is electrically connected to the controller 50. When an occupant is out of position, i.e., one in which the air bag 26 could not provide the occupant with increased protection during a vehicle crash condition, the controller actuates the indicator 76 to warn the occupant. The indicator 76 may take any of several forms such as a light or a buzzer. When warned by the indicator 76, the occupant can reposition himself accordingly so as to make the indicator 76 turn OFF.

Figure 3:
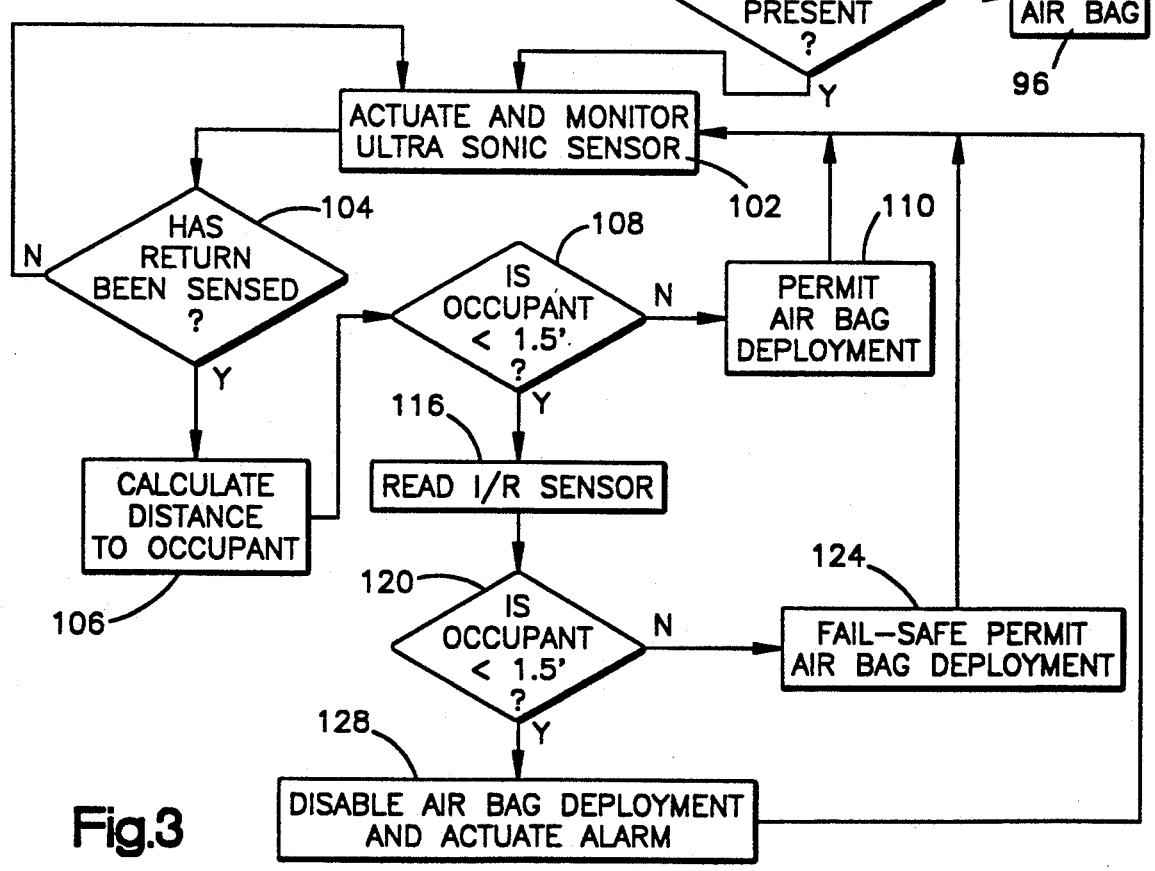
FIG. 3 is a flow chart diagram showing a process for controlling the system of FIG. 1 in accordance with one embodiment of the present invention.
Figures 4, 7:
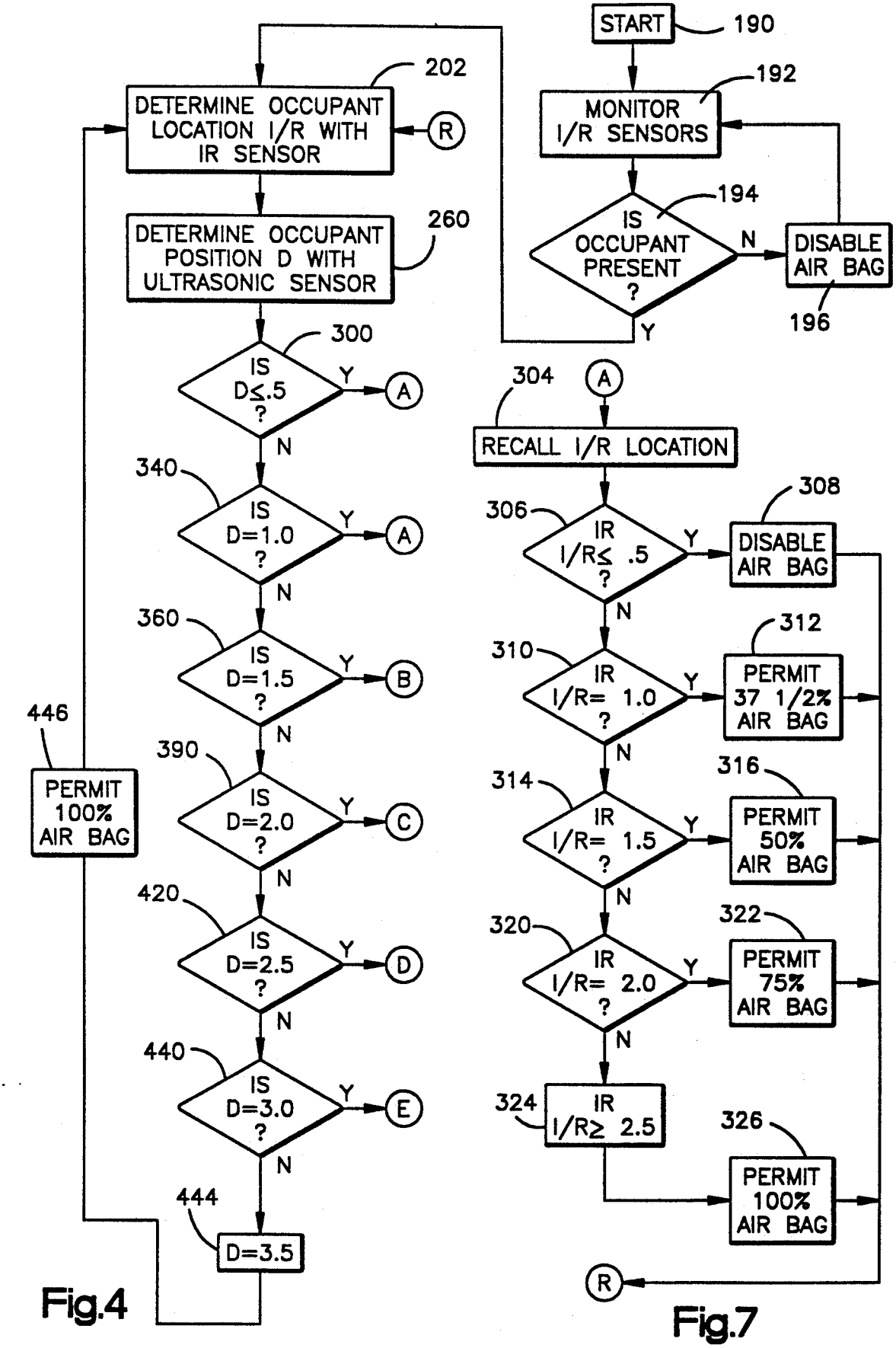
FIGS. 4–11 are flow chart diagrams showing a process for controlling the system of FIG. 1 in accordance with another embodiment of the present invention.

Referring to FIG. 3, one embodiment of a control process, in accordance with the present invention, includes step 90 where system parameters are initialized and internal controller memories reset in a known manner. This initialization step occurs each time the vehicle ignition system is started. After the initialization step 90, the controller 50 monitors the infrared sensors 70 in step 92. The process proceeds to step 94 where a determination is made as to whether an occupant is present on the vehicle seat. If none of the infrared sensors has turned ON, the determination in step 94 is negative. If the determination in step 94 is negative, the process proceeds to step 96 where an air bag disable flag is set in the controller 50. If the air bag disable flag is set in the controller, the air bag is not deployed when a vehicle crash condition occurs. The process then returns to step 92.

If one of the infrared sensors has turned ON, the determination in step 94 is affirmative. From an affirmative determination in step 94, the controller 50 actuates the ultrasonic sensor 60 in step 102 so that an ultrasonic pulse 62 is output from the sensor 60. Also in step 102, the controller 50 monitors the electrical output signal from sensor 60 for an indication of whether or not a return signal 64 has been received. The process proceeds to step 104 where the controller 50 determines if a return signal been sensed by the ultrasonic sensor 60. If the determination in step 104 is negative, the process returns to step 102 where another pulse 62 is output from the sensor 60.

Each time a pulse 62 is output from the sensor 60, the controller starts an internal timer. If a return or echo pulse is received by the sensor 60, the controller stops the timer. When the determination in step 104 is affirmative, the process proceeds to step 106 where the controller determines the distance the occupant is from the sensor and, in effect, the air bag cover 30. This determination is possible because the position of the sensor 60 is known relative to the position or location of the air bag cover 30. The controller 50 makes the distance determination based upon the time lapse between the transmission of the ultrasonic pulse 62 and the receipt of the echo pulse 64. In step 108, the controller makes a determination as to whether the occupant is less than, for example, 1.5 feet from the air bag cover 30 based upon the ultrasonic sensor.

If the determination in 108 is negative, meaning that the occupant is located 1.5 feet or greater away from the air bag cover 30, the process proceeds to step 110 where the controller sets an internal flag which permits air bag deployment upon detection of a vehicle crash condition from the crash sensor 52. From step 110, the process returns to step 102 wherein another ultrasonic pulse 62 is generated.

If the determination in step 108 is affirmative, meaning that the occupant is less than 1.5 feet away from the air bag cover 30, as determined using the ultrasonic sensor 60, the process proceeds to step 116 where the controller 50 monitors the outputs from the infrared sensor 70. The controller 50, in step 120, determines if the infrared sensor 70 indicates that the occupant is less than 1.5 feet away from the air bag cover 30. If the occupant's head has moved into one of the viewing fields aimed at less than 1.5 feet in front of the air bag cover 30, e.g., VF7 or VF8, the controller 50 would determine that the occupant is less than 1.5 feet away from the air bag cover 30.

If the determination in step 120 is negative, meaning that the occupant is determined, according to the infrared sensor 70, to be 1.5 feet or greater away from the air bag cover 30, there is a conflict between the occupant position determination based upon the ultrasonic sensor and that based upon the infrared sensor. Such a condition could occur if the occupant is reading a newspaper while sitting in the occupant seat 36. Under such a condition, the ultrasonic sensor would be receiving a return pulse from the newspaper and not the occupant. The signal from the overhead infrared sensor is the true indication of the occupant position. From a negative determination in step 120, the process proceeds to step 124 where the controller will fail-safe and set an internal flag to permit air bag deployment upon the occurrence of a vehicle crash condition as sensed by the crash sensor 52. After the flag is set in step 124, the process returns to step 102.

If the determination in step 120 is affirmative, meaning that both the ultrasonic sensor and the infrared sensor indicate that the occupant, i.e., the occupant's upper body, is located less than 1.5 feet away from the air bag cover 30, the controller sets its internal air bag disable flag in step 128 and the alarm 76 is actuated to warn the occupant to move away from the air bag cover. When the air bag disable flag is set, the air bag is not deployed upon the occurrence of a crash condition. From step 128, the process returns to step 102.

From the control arrangement shown in FIG. 3, it can be seen that the air bag deployment is disabled only when the two independent sensors 60, 70 both indicate that the occupant is too close to the location of the air bag. The alarm is deactivated if the occupant moves to a proper location and a permit air bag deployment flag is set in step 110 or step 124.

Referring to FIGS. 4–11, another control process in accordance with the present invention includes a start or initialization step 190 where system parameters are initialized and memories reset in a known manner. This initialization step occurs each time the vehicle ignition system is started. After the initialization step 190, the controller 50 monitors the infrared sensors 70 in step 192. The process proceeds to step 194 where a determination is made as to whether an occupant is present on the vehicle seat. If none of the infrared sensors has turned ON, the determination in step 194 is negative. If the determination in step 194 is negative, the process proceeds to step 196 where an air bag disable flag is set in the controller 50. If the air bag disable flag is set in the controller, the air bag is not deployed when a vehicle crash condition occurs. The process then returns to step 192.

Figure 5:
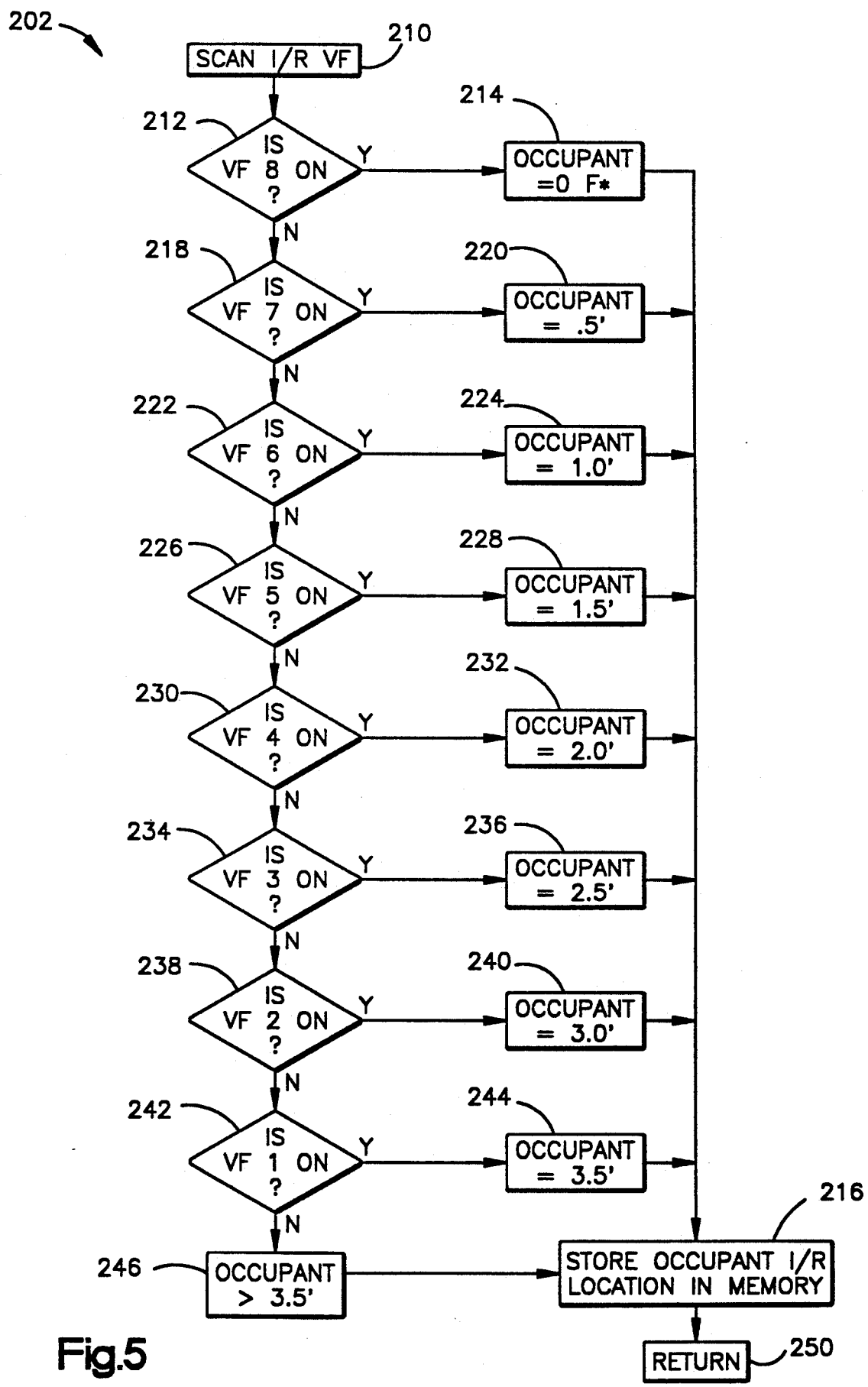

If one of the infrared sensors has turned ON, the determination in step 194 is affirmative. From an affirmative determination in step 194, the controller 50 determines, in step 202, the occupant position using the infrared sensor 70. After the initial entry of the occupant into the viewing fields of the infrared sensors, his continued presence becomes part of the steady state ambient condition. After a certain time period, the outputs of the infrared sensors turn OFF if the occupant does not move. After this certain time period, a turning ON of one of the IR sensors indicates movement by the occupant into that viewing field. It is assumed that detected motion of a sitting occupant is motion of the occupant's upper body. Referring to FIG. 5, the process for determining the occupant location using the infrared sensor 70 is depicted.

In step 210, each of the outputs from the plurality of infrared sensors, i.e., the separate viewing fields VF1–VF8 of the sensor 70, are scanned by the controller 50. In step 212, a determination is made as to whether VF8 is ON. If the determination is affirmative, the occupant location in the controller is set equal to 0 feet in step 214, meaning that the occupant is sensed as being against the air bag cover 30. The occupant location of 0 feet from the air bag cover is stored in the controller's internal memory in step 216 as the I/R location of the occupant. If the determination in step 212 is negative, the process proceeds to step 218.

In step 218, a determination is made as to whether VF7 is ON. If the determination is affirmative, the occupant location in the controller is set equal to 0.5 feet in step 220, meaning that the occupant is sensed to be located 0.5 feet from the air bag cover 30. The occupant's location of 0.5 feet from the air bag cover 30 is stored in the controller's internal memory in step 216 as the I/R location of the occupant. If the determination in step 218 is negative, the process proceeds to step 222.

In step 222, a determination is made as to whether VF6 is ON. If the determination is affirmative, the occupant location in the controller is set equal to 1.0 feet in step 224, meaning that the occupant is sensed as being located 1.0 feet from the air bag cover. The occupant's location of 1.0 feet from the air bag cover is stored in the controller's internal memory in step 216 as the I/R location of the occupant. If the determination in step 222 is negative, the process proceeds to step 226.

In step 226, a determination is made as to whether VF5 is ON. If the determination is affirmative, the occupant location in the controller is set equal to 1.5 feet in step 228, meaning that the occupant is sensed as being located 1.5 feet from the air bag cover. The occupant's location of 1.5 feet from the air bag cover is stored in the controller's internal memory in step 216 as the I/R location of the occupant. If the determination in step 226 is negative, the process proceeds to step 230.

In step 230, a determination is made as to whether VF4 is ON. If the determination is affirmative, the occupant location in the controller is set equal to 2.0 feet in step 232, meaning that the occupant is sensed as being located 2.0 feet from the air bag cover. The occupant's location of 2.0 feet from the air bag cover is stored in the controller's internal memory in step 216 as the I/R location of the occupant. If the determination in step 230 is negative, the process proceeds to step 234.

In step 234, a determination is made as to whether VF3 is ON. If the determination is affirmative, the occupant location in the controller is set equal to 2.5 feet in step 236, meaning that the occupant is sensed as being located 2.5 feet from the air bag cover. The occupant's location of 2.5 feet from the air bag cover is stored in the controller's internal memory in step 216 as the I/R location of the occupant. If the determination in step 234 is negative, the process proceeds to step 238.

In step 238, a determination is made as to whether VF2 is ON. If the determination is affirmative, the occupant location in the controller is set equal to 3.0 feet in step 40, meaning that the occupant is sensed as being located 3.0 feet from the air bag cover. The occupant's location of 3.0 feet from the air bag cover is stored in the controller's internal memory in step 216 as the I/R location of the occupant. If the determination in step 238 is negative, the process proceeds to step 242.

In step 242, a determination is made as to whether VF1 is ON. If the determination is affirmative, the occupant location in the controller is set equal to 3.5 feet in step 244, meaning that the occupant is sensed as being located 3.5 feet from the air bag cover. The occupant's location of 3.5 feet from the air bag cover is stored in the controller's internal memory in step 216 as the I/R location of the occupant. If the determination in step 242 is negative, the process proceeds to step 246 where the occupant's location is set equal to greater than 3.5 feet from the air bag cover. The occupant's location of greater than 3.5 feet from the dashboard is stored in the controller's internal memory in step 216 as the I/R location of the occupant. From step 216, the process returns in step 250 to the main process beginning at step 260 shown in FIG. 4.

Figure 6:
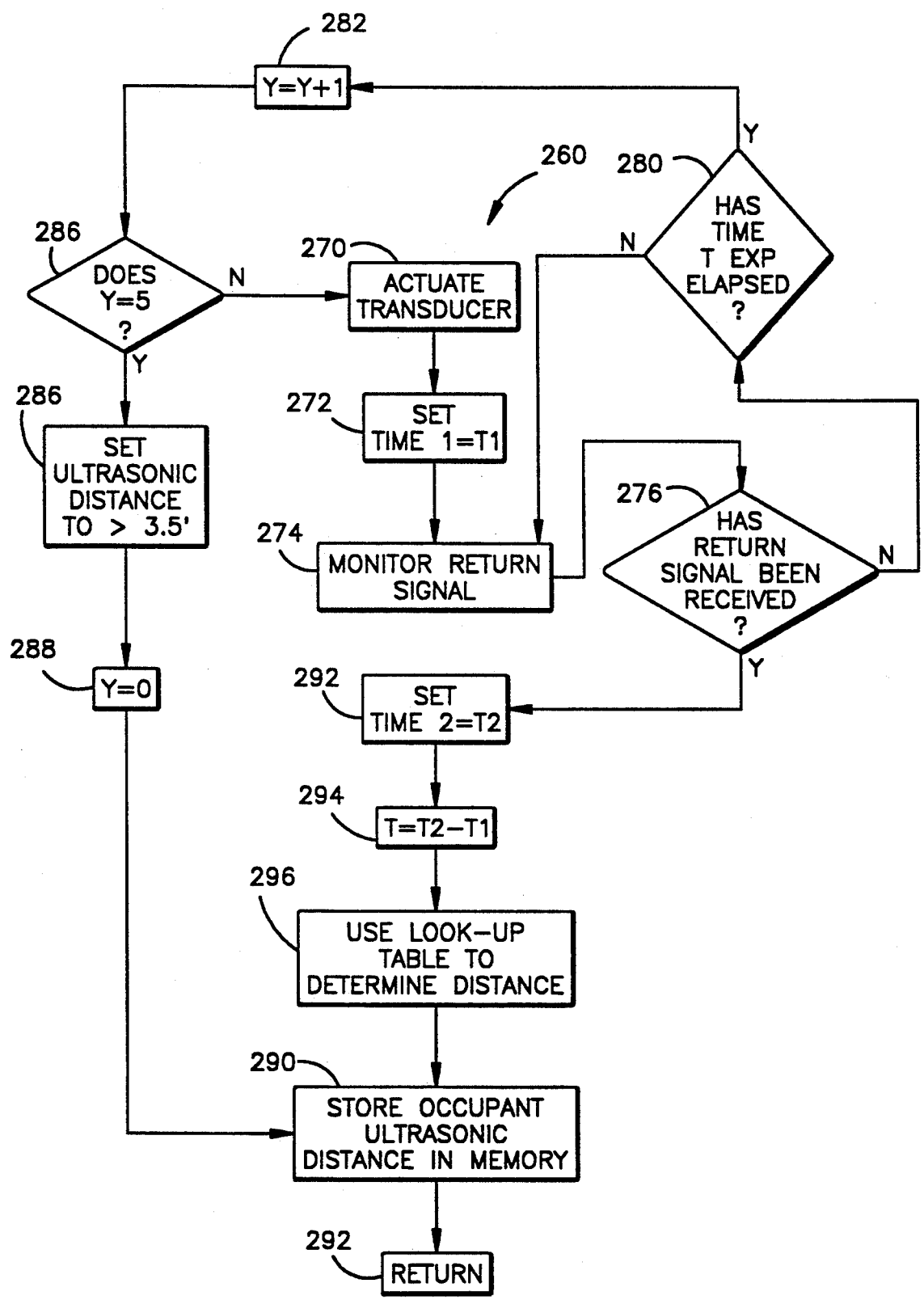
Figure 8:
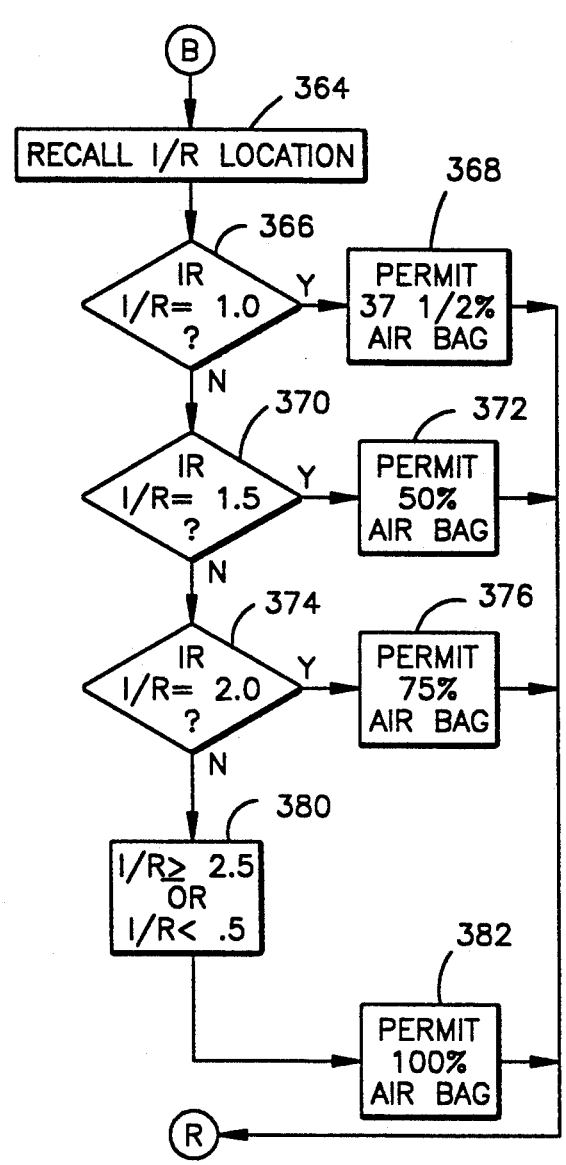
Figure 9:
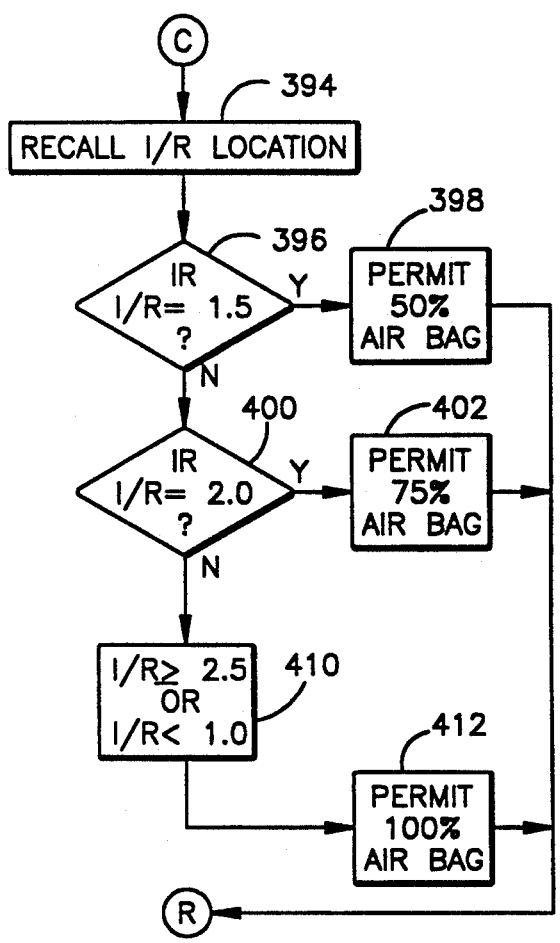
Figure 10:
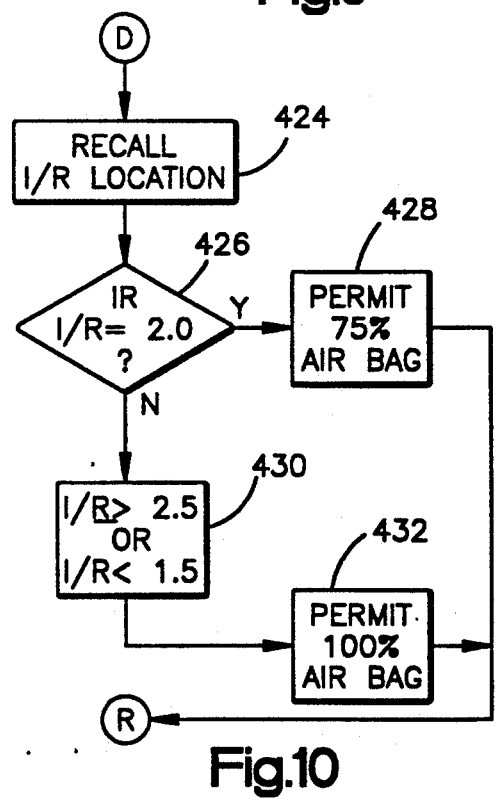
Figure 11:
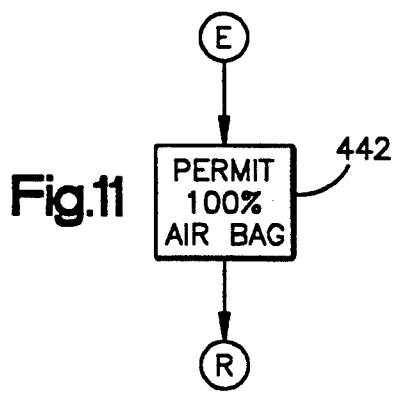

In step 260 a determination is made as to the occupant's position, designated "D" relative to the stored air bag, i.e., the air bag cover 30, using the ultrasonic sensor 60. Referring to FIG. 6, the controller 50 commands the sensor 60 to produce an output pulse 62 in step 270. When the output pulse 62 is provided in step 270, the controller sets a time value TIME 1 equal to T1 in step 272. The process proceeds to step 274 where the controller 50 monitors the electrical output of the sensor 60 for a return signal 64. A determination is made in step 276 as to whether the return signal has been received. If the determination is step 276 is negative, a determination is made in step 280 as to whether a predetermined expiration time T EXP has lapsed. T EXP is equal to a value which is the time the ultrasonic pulse would need to travel to the seat 36 and return to the sensor 60. If the determination is step 280 is negative, the process returns to step 274 where the controller continues to monitor for the return signal.

If the determination in step 280 is affirmative, the process proceeds to step 282. A value of a variable Y was set equal to 0 in the initialization step 190. In step 282, the value of Y is updated to $Y=Y+1$. The process proceeds to step 284 where a determination is made as to whether $Y=5$. If the determination in step 284 is negative, the process returns to step 270 where another pulse from the sensor 60 is provided. If the determination in step 284 is affirmative, the process proceeds to step 286 where the ultrasonic distance is set by default to a value greater than 3.5 feet. From step 286, the process proceeds to step 288 where the value Y is reset to zero and then to step 290 where the value of greater than 3.5 feet from the ultrasonic distance is stored in an internal memory of the controller 50. The process loop of steps 274, 276, 280, 282, 284 insure a fail-safe system condition, i.e., the ultrasonic sensor is actuated a maximum of 5 times to determine the distance between the occupant and the air bag cover. If a return pulse is not received in one of the actuation cycles, the distance as determined from the ultrasonic sensor is set equal to greater than 3.5 feet.

If the determination in step 276 is affirmative, the process proceeds to step 292 where the time TIME 2 when the return or echo pulse is received is stored as T2 in step 292. In step 294, the controller 50 determines the elapsed time T from the time the pulse 62 was produced and the return pulse 64 was received by determining $T=T2-T1$. From the elapsed time T, the controller uses an internal, preprogrammed look-up table in step 296 to look up the ultrasonic distance from the time lapse. The distance from the look-up tables is stored as the value "D" in the controller's internal memory in step 290. After the ultrasonic distance is stored in step 290, the process returns in step 292 to the main process shown in FIG. 4.

From step 260, the process proceeds to step 300 where a determination is made as to whether the distance D less than or equal to 0.5 feet. If the determination is step 300 is affirmative, the process proceeds to a control subroutine shown in FIG. 7 starting with step 304. In step 304, the I/R determined location of the occupant stored in step 216 is recalled. In step 306, a determination is made as to whether the I/R location of the occupant is less than or equal to 0.5 feet. If the determination in step 306 is affirmative, meaning that the I/R location and the position D determined by the ultrasonic sensor are consistent, an air bag disable flag is set in the controller in step 308 and the process returns to step 202. When the disable air bag flag is set in the controller and a vehicle crash is detected by the crash sensor 52, the controller does not actuate the air bag. When the disable air bag flag is set in step 308, the alarm 76 is actuated. The process then returns to step 202. If the determination in step 306 is negative, the process proceeds to step 310.

In step 310, a determination is made as to whether the I/R location of the occupant is equal to 1.0 feet. If the determination in step 310 is affirmative, a 37½% air bag flag is set in the controller in step 312 and the process returns to step 202. When the 37½% air bag flag is set in the controller and a vehicle crash is detected by the crash sensor 52, the controller actuates the air bag so as to have 37½% of the maximum gas that could be produced by charges 40, 42 directed into the air bag for inflation. As mentioned above, this is accomplished by commanding valve 48 open and only firing one of the igniters 44, 46. The process then returns to step 202. If the determination in step 310 is negative, the process proceeds to step 314.

In step 314, a determination is made as to whether the I/R location of the occupant is equal to 1.5 feet. If the determination in step 314 is affirmative, a 50% air bag flag is set in the controller in step 316 and the process returns to step 202. When the 50% air bag flag is set in the controller and a vehicle crash is detected by crash sensor 52, the controller actuates the air bag so as to have 50% of the maximum gas that could be produced by charges 40, 42 directed into the air bag for inflation. As mentioned above, this is accomplished by commanding valve 48 closed and firing only one of the igniters 44, 46. The process than returns to step 202. If the determination in step 314 is negative, the process proceeds to step 320.

In step 320, a determination is made as to whether the I/R location of the occupant is equal to 2.0 feet. If the determination in step 320 is affirmative, a 75% air bag flag is set in the controller in step 322 and the process returns to step 202. When the 75% air bag flag is set in the controller and a vehicle crash is detected by the crash sensor 52, the controller actuates the air bag so as to have 75% of the maximum gas that could be produced by the charges 40, 42 directed into the air bag for inflation. As mentioned above, this is accomplished by commanding valve 48 open and firing both of the igniters 44, 46. The process then returns to step 202. If the determination in step 320 is negative, the process proceeds to step 324.

In step 324, it is assumed that the I/R location of the occupant is equal to or greater than 2.5 feet. From step 324, a 100% air bag flag is set in the controller in step 326 and the process returns to step 202. When the 100% air bag flag is set in the controller and a vehicle crash is detected by the crash sensor 52, the controller actuates the air bag so as to have 100% of the maximum gas produced by the charges 40, 42 directed into the air bag for inflation. As mentioned above, this is accomplished by commanding valve 48 closed and firing both of the igniters 44, 46. The process then returns to step 202.

If the determination in step 300 is negative, the process proceeds to step 340 where a determination is made as to whether the distance D determined from the ultrasonic sensor is equal to 1.0 feet. If the determination is affirmative, the process proceeds to the process shown in FIG. 7 and described above. If the determination in step 340 is negative, the process proceeds to step 360.

In step 360, a determination is made as to whether the distance D is equal to 1.5 feet. If the determination in step 360 is affirmative, the process proceeds to a control process shown in FIG. 8 starting with step 364. In step 364, the I/R determined location of the occupant stored in step 216 is recalled. In step 366, a determination is made as to whether the I/R location of the occupant is equal to 1.0 feet. If the determination in step 366 is affirmative, a 37½% air bag flag is set in the controller in step 368 and the process returns to step 202. When the 37½% air bag flag is set in the controller and a vehicle crash is detected by the crash sensor 52, the controller actuates the air bag so as to have 37½% of the maximum gas that could be produced by the charges 40, 42 directed into the air bag for inflation. The process then returns to step 202. If the determination in step 366 is negative, the process proceeds to step 370.

In step 370, a determination is made as to whether the I/R location of the occupant is equal to 1.5 feet. If the determination in step 370 is affirmative, a 50% air bag flag is set in the controller in step 372 and the process returns to step 202. When the 50% air bag flag is set in the controller and a vehicle crash is detected by the crash sensor 52, the controller actuates the air bag so as to have 50% of the maximum gas that could be produced by the charges 40, 42 directed into the air bag for inflation. The process then returns to step 202. If the determination in step 370 is negative, the process proceeds to step 374.

In step 374, a determination is made as to whether the I/R location of the occupant is equal to 2.0 feet. If the determination in step 374 is affirmative, a 75% air bag flag is set in the controller in step 376 and the process returns to step 202. When the 75% air bag flag is set in the controller and a vehicle crash is detected by the crash sensor 52, the controller actuates the air bag so as to have 75% of the maximum gas that could be produced by the charges 40, 42 directed into the air bag for inflation. The process then returns to step 202. If the determination in step 374 is negative, the process proceeds to step 380.

In step 380, it is assumed that the I/R location of the occupant is equal to or greater than 2.5 feet or less than 0.5 feet. From step 380, a 100% air bag flag is set in the controller in step 382 and the process returns to step 202. When the 100% air bag flag is set in the controller and a vehicle crash is detected by the crash sensor 52, the controller actuates the air bag so as to have 100% of the maximum gas produced by charges 40, 42 directed into the air bag for inflation. This arrangement provides for a fail-safe control of the air bag in the case of a discrepancy between the ultrasonic sensor and the infrared sensor. The process then returns to step 202.

If the determination in step 360 is negative, the process proceeds to step 390. In step 390, a determination is made as to whether the distance D is equal to 2.0 feet. If the determination is step 390 is affirmative, the process proceeds to a control process shown in FIG. 9 starting with step 394. In step 394, the I/R determined location of the occupant stored in step 216 is recalled. In step 396, a determination is made as to whether the I/R location of the occupant is equal to 1.5 feet. If the determination in step 396 is affirmative, a 50% air bag flag is set in the controller in step 398 and the process returns to step 202. When the 50% air bag flag is set in the controller and a vehicle crash is detected by the crash sensor 52, the controller actuate the air bag so as to have 50% of the maximum gas that could be produced by charges 40, 42 directed into the air bag for inflation. The process then returns to step 202. If the determination in step 396 is negative, the process proceeds to step 400.

In step 400, a determination is made as to whether the I/R location of the occupant is equal to 2.0 feet. If the determination in step 400 is affirmative, a 75% air bag flag is set in the controller in step 402 and the process returns to step 202. When the 75% air bag flag is set in the controller and a vehicle crash is detected by the crash sensor 52, the controller actuates the air bag so as to have 75% of the maximum gas that could be produced by charges 40, 42 directed into the air bag for inflation. If the determination in step 400 is negative, the process proceeds to step 410.

In step 410, it is assumed that the I/R location of the occupant is equal to or greater than 2.5 feet or less than 1.0 feet. From step 410, a 100% air bag flag is set in the controller in step 412 and the process returns to step 202. When the 100% air bag flag is set in the controller and a vehicle crash is detected by the crash sensor 52, the controller actuates the air bag so as to have 100% of the maximum gas produced by charges 40, 42 directed into the air bag for inflation. This arrangement provides for a fail-safe control of the air bag in the case of a discrepancy between the ultrasonic sensor and the infrared sensor. The process then returns to step 202.

If the determination in step 390 is negative, the process proceeds to step 420. In step 420, a determination is made as to whether the distance D is equal to 2.5 feet. If the determination in step 420 is affirmative, the process proceeds to a control process shown in FIG. 10 starting with step 424. In step 424, the I/R determined location of the occupant stored in step 216 is recalled. In step 426, a determination is made as to whether the I/R location of the occupant is equal to 2.0 feet. If the determination in step 426 is affirmative, a 75% air bag flag is set in the controller in step 428 and the process returns to step 202. When the 75% air bag flag is set in the controller and a vehicle crash is detected by the crash sensor 52, the controller actuates the air bag so as to have 75% of the maximum gas that could be produced by charges 40, 42 directed into the air bag for inflation. If the determination in step 426 is negative, the process proceeds to step 430.

In step 430, it is assumed that the I/R location of the occupant is equal to or greater than 2.5 feet or less than 1.5 feet. From step 430, a 100% air bag flag is set in the controller in step 432 and the process returns to step 202. When the 100% air bag flag is set in the controller and a vehicle crash is detected by the crash sensor 52, the controller actuates the air bag so as to have 100% of the maximum gas that could be produced by charges 40, 42 directed into the air bag for inflation. This arrangement provides for a fail-safe control of the air bag in the case of a discrepancy between the ultrasonic sensor and the infrared sensor. The process returns to step 202.

If the determination in step 420 is negative, the process proceeds to step 440. In step 440, a determination is made as to whether the distance D determined from the ultrasonic sensor is equal to 3.0 feet. If the determination is affirmative in step 440, a 100% air bag flag is set in the controller in step 442, shown in FIG. 11, and the process returns to step 202. When the 100% air bag flag is set in the controller and a vehicle crash is detected by the crash sensor 52, the controller actuates the air bag so as to have 100% of the maximum gas produced by charges 40, 42 directed into the air bag for inflation. The process then returns to step 202.

If the determination in step 440 is negative, the process proceeds to step 444. In step 444, it is assumed that the distance D is equal to 3.5 feet and the 100% air bag flag in the controller 50 is set in step 446. When the 100% air bag flag is set in the controller and a vehicle crash is detected by the crash sensor 52, the controller actuates the air bag so as to have 100% of the maximum gas produced by charges 40, 42 directed into the air bag for inflation. The process then returns to step 202.

The process shown in FIGS. 4-11 provides a control arrangement that senses occupant location with two independent sensors. Before the air bag is disabled or before the degree of inflation is reduced, both occupant position sensors must be in agreement. If there is a discrepancy between the determined occupant's position relative to the air bag cover as determined using the two sensors, a fail-safe condition is assumed and the air bag is inflated fully.

Figure 12:
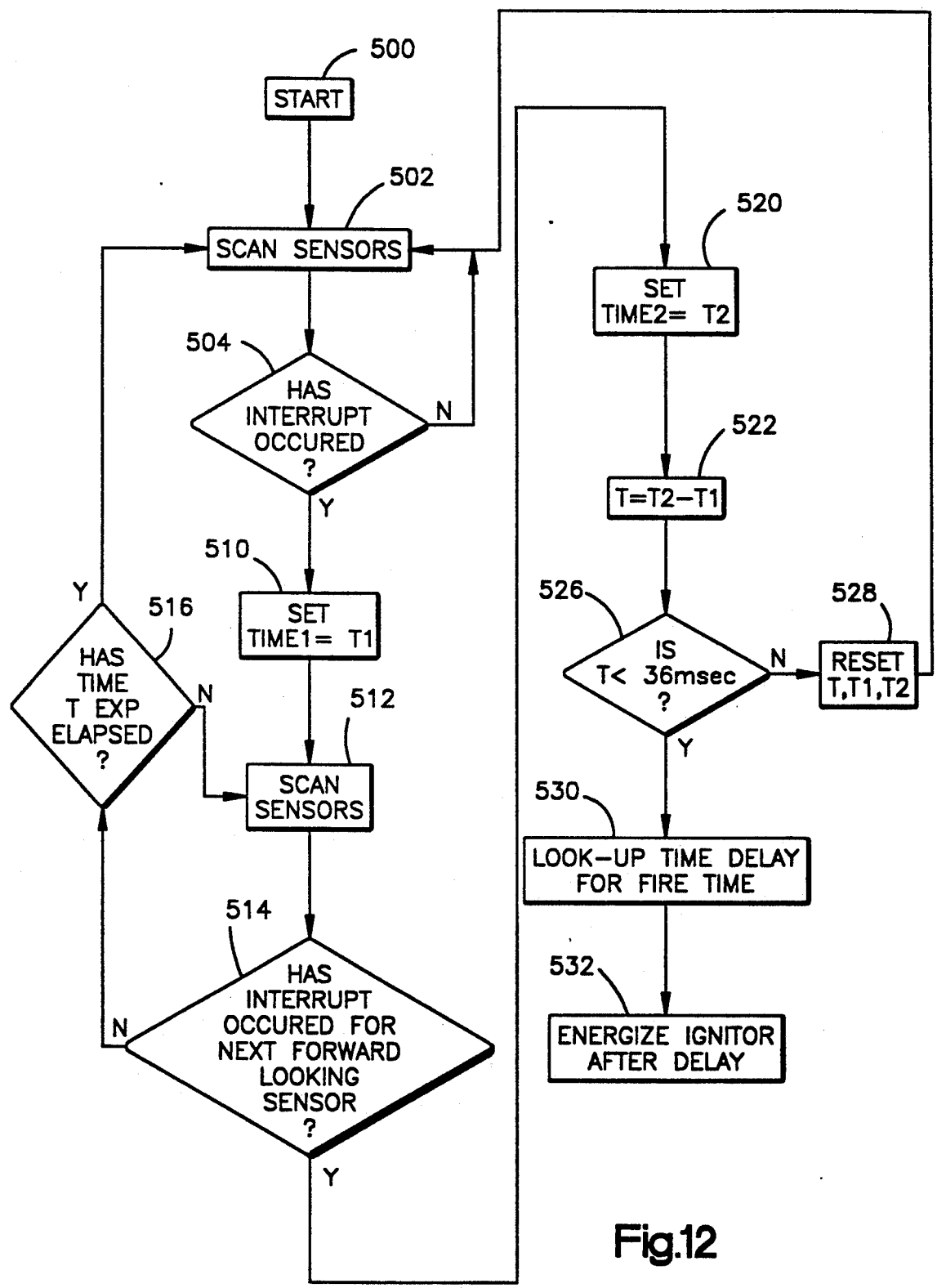
FIG. 12 is a flow chart diagram showing a process for controlling the system of FIG. 1 in accordance with yet another embodiment of the present invention.

In accordance with another embodiment of the present invention, the actuation of the restraint device is controlled in response to the rate of detected movement of the occupant using the plurality of infrared sensors 70, i.e., the plurality of viewing fields VF1-VF8 of the sensor, mounted to the headliner 72. Referring to FIG. 12, an initialization of the controller in step 500 occurs upon start of the vehicle motor. As discussed above, the VF1-VF8 will turn ON when the occupant first enters the vehicle and sits on the seat. After a certain time period of no motion, the sitting occupant becomes part of the ambient and the sensors turn OFF. When the occupant's upper body moves thereafter into a different field of view, the sensor for that field of view turns ON. The sensor switches ON because the occupant's head is at a closer distance to the sensor than the occupant's legs and the amount of infrared radiation detected correspondingly increases. In step 502, each of the viewing fields VF1-VF8 from the sensor 70 are scanned. The process proceeds to step 504 where a determination is made as to whether an interrupt has occurred from one of the viewing fields. An interrupt occurring means that an output of one of the viewing fields has switched from an OFF to an ON condition. If the determination in step 504 is negative, the process returns to step 502. If the determination in step 504 is affirmative, the process proceeds to step 510.

In step 510, the time TIME 1 when the interrupt occurred is stored as T1. In step 512, the sensor outputs are again scanned for another interrupt. In step 514, a determination is made as to whether an interrupt of a viewing field has occurred for the next forward viewing infrared sensor or viewing field. When such an interrupt occurs, this means that the occupant is moving forward as would occur during a vehicle crash condition. If the determination in step 514 is negative, the process proceeds to step 516 where a determination is made as to whether a predetermined time T EXP has elapsed from the time T1. If the determination in step 516 is affirmative, the process returns to step 502. An affirmative determination in step 516 indicates that the occupant is not moving forward fast enough for such movement to have been caused by a vehicle crash condition. If the determination in step 516 is negative, the process returns to step 512.

If the determination in step 514 is affirmative, the process proceeds to step 520 where the TIME 2 when the interrupt of the next forward looking sensor occurred is stored as T2. In step 522, the time T between interrupts of adjacent sensors is determined by $T = T2 - T1$. This time between interrupts of adjacent sensors is indicative of the forward moving speed of the occupant. If the forward moving speed of the occupant is greater than a predetermined value, as represented by the value T being less than a predetermined value, it is desirable to actuate the restraint device. A determination is made in step 526 as to whether T is less than 36 msec. If the determination in step 526 is negative, the values of T, T1, and T2 are reset in step 528 and the process returns to step 502. If the determination in step 526 is affirmative, meaning that the occupant is moving forward at such a rate that the movement must be the result of a vehicle crash condition, the process proceeds to step 530.

In step 530, the controller determines the time delay before actuation of the restraint system based on the position of the occupant and upon his forward moving speed. This feature is accomplished by the controller using internal look-up tables based upon sensed occupant position and forward moving speed. In step 532, the restraint system is actuated after any delay period determined in step 530.

The embodiment shown in FIG. 12 may be combined with the embodiment shown in FIGS. 4-11 with the embodiment of FIG. 12 replacing the crash sensor 52 in the embodiment of FIGS. 4-11.

This invention has been described with reference to preferred embodiments. Modifications and alterations may occur to others upon reading and understanding this specification. For example, the specific distances used in describing the present invention were given only for explanation purposes. Those skilled in the art will appreciate that any distances may be used and that the distances are dependant upon the vehicle type. It is our intention to include all such modifications and alterations insofar as they come within the scope of the appended claims and the equivalents thereof.

Having fully described the invention, the following is claimed:

1. An apparatus for detecting position of an occupant in an occupant compartment of a vehicle, said apparatus comprising:

first sensing means mounted at a known location near the front of the occupant compartment for sensing the position of the occupant relative to a predetermined reference location in the occupant compartment and for generating a first electric signal indicative of the sensed position of the occupant relative to the predetermined reference location by said first sensing means;

second sensing means mounted at a location rearward of said first sensing means and adjacent the occupant for sensing the position of the occupant relative to the predetermined reference location in the occupant compartment and for providing a second electric signal indicative of the sensed position of the occupant relative to the predetermined reference location by said second sensing means; and control means connected to said first sensing means and to said second sensing means for providing an electric enable signal when at least one of said first electric signal from said first sensing means and said second electric signal from said second sensing means indicates the occupant is at a first predetermined position relative to the predetermined reference location in the occupant compartment, said control means providing a disable signal only when both said first electric signal from said first sensing means and said second electric signal from said second sensing means indicate the occupant is at a second predetermined position relative to the predetermined reference location in the occupant compartment.

2. The apparatus of claim 1 wherein said second sensing means is positioned in a headliner of the vehicle and is located between the back of an occupant seat and the dashboard.

3. The apparatus of claim 2 wherein said second sensing means is an infrared sensor having a plurality of viewing fields, each viewing field providing an associated electric signal indicative of movement of an animate object in its viewing field.

4. The apparatus of claim 1 wherein said first sensing means is an ultrasonic sensor.

5. The apparatus of claim 1 wherein said first sensing means is an active infrared sensor.

6. An apparatus for detecting position of an occupant in a vehicle relative to a predetermined reference location in the vehicle's occupant compartment, said apparatus comprising:

a displacement sensor mounted near the front of the occupant compartment of the vehicle at a known location relative to the predetermined reference location for sensing distance between the displacement sensor and the occupant and for generating an electric signal having a value indicative of the sensed distance between said displacement sensor and the occupant;

an infrared sensor mounted in the occupant compartment at a location rearward of said displacement sensor and aimed at a location between the back of an associated occupant seat and the predetermined reference location, said infrared sensor having a plurality of viewing fields for sensing the location of the occupant relative to the predetermined reference location and for providing an output signal having a value indicative of the occupant's location relative to said predetermined reference location; and control means connected to said infrared sensor for determining the distance between the occupant and the predetermined reference location in response to the output of said infrared sensor, said control means being further connected to said displacement sensor for determining the distance between the occupant and the predetermined reference location in response to the output of said displacement sensor and providing an electric enable signal when at least one of the determined distances between the occupant and the predetermined reference location determined from the displacement sensor output and indicated by the infrared sensor output is at least a first predetermined distance from said predetermined reference location, said control means further providing a disable signal only when both determined distances indicate the occupant is less than a second predetermined distance from said predetermined reference location.

7. The apparatus of claim 6 wherein said infrared sensor is positioned in a headliner of the vehicle and is aimed in a downward looking direction.

8. The apparatus of claim 7 wherein said infrared sensor has at least four viewing fields.

9. The apparatus of claim 6 wherein said displacement sensor is an ultrasonic sensor.

10. The apparatus of claim 6 wherein said displacement sensor is an active infrared sensor.

11. The apparatus of claim 6 wherein said control means includes means for providing a control signal having a value functionally related to the distance between the predetermined reference location and the occupant.

12. An apparatus for controlling actuation of a vehicle occupant restraint system, said apparatus comprising:

a displacement sensor mounted to a dashboard a known distance from a predetermined reference location of the vehicle for sensing distance between the predetermined reference location and the occupant in a seat of the vehicle and for generating an electric signal having a value indicative of the sensed distance between said predetermined reference location and the occupant;

an infrared sensor mounted at a location rearward of said displacement sensor and aimed at a location between the back of the occupant seat and the dashboard, said infrared sensor having a plurality of viewing fields for sensing the location of the occupant relative to said predetermined reference location and for providing an output indicative of the occupant'location relative to said predetermined reference location;

control means connected to said infrared sensor for determining the distance between the occupant and said predetermined reference location in response to the output of said infrared sensor, said control means being further connected to said displacement sensor for providing an electric enable signal to permit actuation of the occupant restraint system when at least one of the distances between the occupant and the predetermined reference location indicated by said displacement sensor and determined from said infrared sensor is at least a predetermined distance;

means for actuating said restraint system upon the occurrence of a vehicle crash condition only when said electric enable signal is provided; and means for providing a disable signal only when both said distance from said displacement sensor and distance determined from said infrared sensor are less than second predetermined distance from said predetermined reference location, said disable signal preventing actuation of said restraint system.

13. The apparatus of claim 12 wherein said infrared sensor is positioned in a headliner of the vehicle and is aimed in a downward looking direction.

14. The apparatus of claim 13 wherein said infrared sensor has at least four viewing fields.

15. The apparatus of claim 14 wherein said control means includes means for individually monitoring each of the viewing fields, means for determining the rate of forward movement of the occupant in response to the occupant moving into different of said viewing fields with respect to time, and means for providing a signal indicative of the occurrence of a vehicle crash condition when the occupant's rate of forward motion exceeds a predetermined value, said means for actuating said restraint system being responsive to said signal from said control means indicative of a vehicle crash condition.

16. The apparatus of claim 12 wherein said displacement sensor is an ultrasonic sensor.

17. The apparatus of claim 12 wherein said displacement sensor is an active infrared sensor.

18. A passenger restraint system for a vehicle comprising:

an air bag mounted in an air bag storage location in the occupant compartment of the vehicle;

means for providing gas to inflate said air bag in response to a trigger signal;

means for monitoring a vehicle crash event and providing an electric signal having a value indicative of the occurrence of a vehicle crash event;

first sensing means mounted to a dashboard of the vehicle at a known location relative to the air bag storage location for sensing distance between the air bag storage location and an occupant and for generating a first electric signal indicative of the sensed distance between the air bag storage location and the occupant by said first sensing means;

second sensing means mounted at a location rearward of said first sensing means relative to the vehicle and adjacent the occupant for sensing the distance between the air bag storage location and the occupant and for providing a second electric signal indicative of the sensed distance between the air bag storage location and the occupant by said second sensing means; and control means connected to said first sensing means and to said second sensing means for providing said trigger signal to said means for providing gas to said air bag when said means for monitoring a vehicle crash event provides said electric signal indicative of the occurrence of a vehicle crash event and when at least one of said first electric signal from said first sensing means and said second electric signal from said second sensing means indicates the occupant is at least a predetermined distance from said air bag storage location, said control means providing a disable signal only when both said first electric signal from said first sensing means and said second electric signal from said second sensing means indicate the occupant is less than said predetermined distance from said air bag storage location, said disable signal preventing said trigger signal.

19. The apparatus of claim 18 wherein said second sensing means includes an infrared sensor having a plurality of separately monitorable viewing fields and wherein said means for monitoring a vehicle crash event includes means for individually monitoring each of the viewing fields of said infrared sensor, means for determining the forward movement of the occupant in response to the occupant moving into different of said viewing fields with respect to time, and means for providing a Signal indicative of the occurrence of a vehicle crash condition when the occupant's rate of forward motion exceeds a predetermined value.

20. The apparatus of claim 18 wherein said means for providing gas to inflate said air bag includes means to provide a selectable amount of gas to the air bag and wherein said control means includes means for controlling said means to provide a selectable amount of gas to the air bag in response the distance between the air bag storage location and the occupant as determined by at least one of said first sensing means and said second sensing means.

21. The apparatus of claim 20 wherein said means to provide a selectable amount of gas to the air bag includes a plurality of gas generating sources separately controllable by said control means.

22. The apparatus of claim 21 wherein said control means actuates a number of gas generating sources proportional to the distance between the air bag storage location and the occupant so that the closer the occupant is to the air bag storage location, the fewer gas generating sources are actuated upon the occurrence of a crash event.

23. The apparatus of claim 20 wherein said means to provide a selectable amount of gas to the air bag includes an electrically controlled vent operatively coupled between a gas generating source and atmosphere and controllably connected to said control means, said control means actuating said electrically controlled vent in response to the distance between the occupant and the air bag storage location as sensed by at least one of said first sensing means and said second sensing means.

24. The apparatus of claim 23 wherein said control means vents gas produced by said gas generating sources as a function of the distance between the air bag storage location and the occupant so that the closer the occupant is to the dashboard, the more gas is vented to atmosphere upon the occurrence of a crash event.

25. A method for detecting position of an occupant in an occupant compartment of a vehicle, said method comprising the steps of:

mounting a first sensor at a known location near the front of the occupant compartment for sensing the position of the occupant relative to a predetermined reference location in the occupant compartment;

generating a first electric signal indicative of the sensed position of the occupant relative to the predetermined reference location by said first sensor;

mounting a second sensor at a location rearward of said first sensor and adjacent the occupant for sensing the position of the occupant relative to the predetermined reference location in the occupant compartment;

generating a second electric signal indicative of the sensed position of the occupant relative to the predetermined reference location by said second sensor;

generating an electric enable signal when at least one of said first electric signal from said first sensor and said second electric signal from said second sensor indicates the occupant is at a first predetermined position relative to the predetermined reference location in the occupant compartment; and generating an electric disable signal only when both said first electric signal from said first sensor and said second electric signal from said second sensor indicate the occupant is at a second predetermined position relative to the predetermined reference location in the occupant compartment.

26. The method of claim 25 wherein said step of mounting a second sensor includes mounting said second sensor to a headliner of the vehicle at a location between the back of the occupant's seat and the dashboard.

27. The method of claim 20 wherein the step of providing a second sensor comprises the step of providing an infrared sensor and further including the steps of dividing the viewing field of the infrared sensor into a plurality of separate viewing fields and providing a separate electric signal indicative of movement of an animate object in such field of view.

28. A method for detecting a position of an occupant in a vehicle relative to a predetermined reference location in the vehicle's occupant compartment, said method comprising the steps of:

mounting a displacement sensor near the front of the occupant compartment of the vehicle at a known location relative to the predetermined reference location for sensing distance between the displacement sensor and the occupant;

generating a first electric signal having a value indicative of the distance between said occupant and the displacement sensor as sensed by the displacement sensor;

determining the distance between the occupant and the predetermined reference location in response to said first electric signal;

mounting an infrared sensor in the occupant compartment at a location rearward of said displacement sensor and aimed at a location between the back of a seat in which the occupant sets and the predetermined reference location;

dividing the field of view of said infrared sensor into a plurality of viewing fields;

sensing, using the infrared sensor, the location of the occupant between the predetermined reference location and the back of the seat;

generating a second electrical signal having a value indicative of the occupant's location relative to said predetermined reference location based the output of the infrared sensor;

determining the distance between the occupant and the predetermined reference location in response to said second electric signal;

providing an electric enable signal when at least one of the determined distances indicates that the occupant is at least a predetermined distance from said predetermined reference location; and providing a disable signal only when both the determined distances indicate the occupant is less than a second predetermined distance from said predetermined reference location.

29. The apparatus of claim 28 wherein said step of mounting an infrared sensor includes mounting said infrared sensor in the headliner of the vehicle aimed in a downward looking direction.

30. The apparatus of claim 29 further including the step of dividing the viewing field of the infrared sensor into at least four separate viewing fields.

31. A method for controlling actuation of a vehicle occupant restraint system, said method comprising the steps of:

mounting a displacement sensor to a dashboard of the vehicle a known distance from a predetermined reference location;

sensing the distance between the predetermined reference location and the occupant in a seat of the vehicle using the displacement sensor;

generating a first electric signal having a value indicative of the sensed distance between said predetermined reference location and the occupant by said displacement sensor;

mounting an infrared sensor at a location rearward of said displacement sensor and aiming said infrared sensor at a location between the back of the occupant's seat and the predetermined reference location;

dividing the viewing field of said infrared sensor into a plurality of separate viewing fields for sensing the location of the occupant relative to the predetermined reference location;

generating a second electric signal having an output indicative of the occupant's location relative to said predetermined reference location;

determining the distance between the occupant and the predetermined reference location in response to the output of said infrared sensor;

generating an electric enable signal when at least one of the determined distances indicates that the occupant is at least a predetermined distance from said predetermined reference location;

actuating the restraint system upon the occurrence of a vehicle crash condition only when the electric enable signal is provided; and providing an electric disable signal only when both the determined distances indicate the occupant is less the predetermined distance from said predetermined reference location, said disable signal preventing actuation of said restraint system.

32. The method of claim 31 wherein said step of mounting said infrared sensor includes located said infrared sensor in a headliner of the vehicle and aiming, said infrared sensor in a downward looking direction.

33. The method of claim 32 wherein said step of dividing said viewing field of said infrared sensor into separate viewing fields includes the step of dividing said viewing field into at least four viewing fields.

34. The method of claim 33 further including the steps of individually monitoring each of the viewing fields, determining the forward movement of the occupant in response to the occupant moving into different of the viewing fields with respect to time, and providing a signal indicative of the occurrence of a vehicle crash condition when the occupant's rate of forward motion exceeds a predetermined value, and wherein said step of actuating the restraint system is responsive to the signal indicative of a vehicle crash condition.

35. A method for controlling a passenger restraint system for a vehicle including an air bag mounted at an air bag storage location, and means for providing gas to inflate said air bag in response to a trigger signal, said method comprising the steps of:

mounting a first sensor to a dashboard of the vehicle at a known position relative to the air bag storage location;

sensing the distance between the dashboard and an occupant with said first sensor;

generating a first electric signal indicative of the sensed distance between the air bag storage location and the occupant by said first sensor;

mounting a second sensor at a location rearward of said first sensor relative to the vehicle and adjacent the occupant;

sensing the distance between the air bag storage location and the occupant with said second sensor;

generating a second electric signal indicative of the sensed distance between the air bag storage location and the occupant by said second sensor;

monitoring for a vehicle crash event; and providing said trigger signal to the means for providing gas to the air bag when a vehicle crash event is monitored and when at least one of said first electric signal from the first sensor and the second electric signal from the second sensor indicates the occupant is at least a predetermined distance from said air bag storage location and providing a disable signal to prevent said trigger signal only when both the first electric signal from said first sensor and the second electric signal from said second sensor indicates the occupant is less than the predetermined distance from said air bag storage location.

36. The method of claim 35 wherein the second sensor includes an infrared sensor and wherein said method further includes the steps of dividing the viewing field of the infrared sensor into a plurality of separately monitorable viewing fields, and wherein the step of monitoring for a vehicle crash event includes separately monitoring each of the viewing fields of said infrared sensor, determining the forward movement of the occupant in response to the occupant moving into different of the viewing fields with respect to time, and providing a signal indicative of the occurrence of a vehicle crash condition when the occupant's rate of forward motion exceeds a predetermined value.

37. The method of claim 35 further including the step of providing a selectable amount of gas to the air bag in response the distance between the air bag storage location and the occupant as determined by at least one of the first sensor and the second sensor.

38. The method of claim 37 wherein the step of providing a selectable amount of gas to the air bag includes controlling actuation of a number of gas generating sources in proportion to the distance between the air bag storage location and the occupant so that the closer the occupant is to the air bag storage location, the fewer gas generating sources are actuated upon the occurrence of a crash event.

39. The method of claim 38 wherein the means for providing gas to inflate the air bag of the passenger restrain system includes an electrically controlled vent operatively coupled between a gas generating source and atmosphere, and wherein the step of providing a selectable amount of gas to the air bag includes actuating the electrically controlled vent in response to the distance between the occupant and the air bag storage location as sensed by at least one of the first sensor and the second sensor.

40. The method of claim 39 wherein the step of actuating the electrically controlled vent includes controlling the vent so that gas produced by the gas generating sources is vented to atmosphere as a function of the distance between the air bag storage location and the occupant so that the closer the occupant is to the air bag storage location, the more gas is vented to atmosphere upon the occurrence of a crash event.

* * * * *

UNITED STATES PATENT AND TRADEMARK OFFICE
CERTIFICATE OF CORRECTION

PATENT NO. : 5,330,226

DATED : July 19, 1994

INVENTOR(S) : Scott B. Gentry, Joseph F. Mazur and Brian K. Blackburn

It is certified that error appears in the above-identified patent and that said Letters Patent is hereby corrected as shown below:

Column 18, line 58, change "occupant'location" to --occupant's location--.

Column 20, line 17, change "Signal" to --signal--.

Column 21, line 25, change "20" to --26--.

Column 22, line 55, after "aiming" delete --,--.

Signed and Sealed this

Eighteenth Day of October, 1994

Attest:

BRUCE LEHMAN

*Attesting Officer*     *Commissioner of Patents and Trademarks*